United States Patent
Zhang

(10) Patent No.: US 6,723,200 B1
(45) Date of Patent: Apr. 20, 2004

(54) METHOD FOR RELEASING LAMINATED MATERIALS

(75) Inventor: Sukun Zhang, Mt. Pleasant, SC (US)

(73) Assignee: MeadWestvaco Corporation, Stamford, CT (US)

( * ) Notice: Subject to any disclaimer, the term of this patent is extended or adjusted under 35 U.S.C. 154(b) by 139 days.

(21) Appl. No.: 09/854,367

(22) Filed: May 11, 2001

Related U.S. Application Data

(63) Continuation-in-part of application No. 09/376,516, filed on Aug. 18, 1999, now abandoned.

(51) Int. Cl.$^7$ .................... B32B 31/20; B32B 33/00
(52) U.S. Cl. ................................ 156/289; 106/2
(58) Field of Search ................. 156/182, 289, 156/323; 221/289; 106/2

(56) References Cited

U.S. PATENT DOCUMENTS

| | | |
|---|---|---|
| 347,200 A | 8/1886 | Robinson et al. |
| 3,050,434 A | 8/1962 | Emily, Jr. et al. |
| 3,105,823 A | 10/1963 | Boneau |
| 3,215,579 A | 11/1965 | Hagen |
| 3,898,114 A | 8/1975 | Ward |
| 4,013,627 A | 3/1977 | Temple |
| 4,117,199 A | 9/1978 | Gotoh et al. |
| 4,147,851 A | 4/1979 | Raynolds |
| 4,243,461 A | 1/1981 | Jaisle et al. |
| 4,263,073 A | 4/1981 | Jaisle et al. |
| 4,327,121 A | 4/1982 | Gray, III |
| 4,510,199 A | 4/1985 | Brooker |
| 4,513,059 A * | 4/1985 | Dabroski ............... 428/355 R |
| 4,525,423 A | 6/1985 | Lynn et al. |
| 4,689,102 A * | 8/1987 | Prawdzik et al. ........... 156/235 |
| 4,923,940 A | 5/1990 | Hsu |
| 5,338,345 A | 8/1994 | Scarborough et al. |
| 5,425,991 A | 6/1995 | Lu |
| 5,498,659 A * | 3/1996 | Esser ......................... 524/549 |
| 5,654,039 A | 8/1997 | Wenzel et al. |
| 5,725,789 A | 3/1998 | Huber et al. |
| 6,103,802 A | 8/2000 | Zhang et al. |
| 6,429,247 B1 | 8/2002 | Shah et al. |
| 6,433,052 B1 | 8/2002 | Shah et al. |
| 6,437,033 B1 | 8/2002 | Shah et al. |
| 6,437,037 B1 | 8/2002 | Hutter |

FOREIGN PATENT DOCUMENTS

| | | | |
|---|---|---|---|
| GB | 1260477 A * | 1/1972 | ........... C08F/29/42 |

OTHER PUBLICATIONS

U.S. patent application Ser. No. 09/904,224, Rumble et al., filed Jul. 2001.

U.S. patent application Ser. No. 10/324,173, St. Arnauld, filed Dec. 2002.

* cited by examiner

Primary Examiner—Richard Crispino
Assistant Examiner—Sing P. Chan
(74) Attorney, Agent, or Firm—Daniel B. Reece, IV; Terry B. McDaniel

(57) ABSTRACT

This invention relates to an improvement in the art of making high pressure laminated materials utilizing saturating kraft paper. More particularly, the invention relates to release sheets coated with an aqueous polymeric composition which makes the sheets useful in the production of heat and pressure consolidated laminated materials. Papers which are coated with these aqueous polymeric compositions exhibit excellent release properties which, when employed as release sheets, permit high pressure laminates to be easily separated.

20 Claims, 1 Drawing Sheet

Schematic of Laminate Lay-Up with Release Sheets

Schematic of Laminate Lay-Up with Release Sheets

METHOD FOR RELEASING LAMINATED MATERIALS

This application is a continuation-in-part of our commonly assigned, U.S. patent application Ser. No. 09/376,516 filed Aug. 18, 1999, entitled "Acrylic Water-Based Release Coatings for High Pressure Laminates", now abandoned.

FIELD OF INVENTION

This invention relates to an improvement in the art of making high pressure laminated materials utilizing saturating kraft paper. More particularly, the invention relates to release sheets coated with an aqueous polymeric composition which makes the sheets useful in the production of heat and pressure consolidated laminated materials. Papers which are coated with these aqueous polymeric compositions exhibit excellent release properties which, when employed as release sheets, permit high pressure laminates to be easily separated.

BACKGROUND OF THE INVENTION

High pressure laminates are laminated articles typically made of a plurality of core sheets, a decorative sheet and, where desired, an overlay sheet. The sheets are coated with lamination polymers which are typically thermosetting materials, such as melamine or phenolic resins.

The core sheets are made from resin saturable paper (also known as saturating kraft paper). The number of core sheets used depends on the application requirements (i.e. strength and environment) and the desired thickness of the laminate. Laminates normally have a thickness ranging from 0.030 to 0.090 inch. The core sheets are typically saturated with phenolic resins.

The decorative sheets are commonly made of very heavy paper comprised of cellulose fibers and may contain an opacifying pigment (such as titanium oxide). While decorative sheets are usually printed upon with designs to create a decorative pattern for the laminate, the sheets may be left plain for industrial purposes. The decorative sheets are typically saturated with melamine resins.

The overlay sheets are clear cellulose sheets which act as a protective layer over the decorative sheet. These sheets are usually saturated with melamine resins. The overlay sheets are used optionally depending on the need for protective surfaces.

In a typical process for preparing laminates, the sheets are saturated with the appropriate thermoset resins and then stacked. The stacked sheet assembly is subsequently placed in a press and consolidated under heat and pressure. During this operation the resin flows sufficiently to displace air between the sheets. Simultaneously the resin polymerizes into a rigid solid, thereby producing a monolithic structure as the finished laminate composite.

It is economically desirable to produce a number of laminate panels from one pressing operation by placing a plurality of sheet assemblies in the press at the same time. FIG. 1 shows the layering of two sheet assemblies which are divided by release sheets. Release sheets are placed between the core layers of the two sheet assemblies to facilitate the separation of the two laminate panels by preventing the respective core layers from fusing together.

Traditionally, a sheet of glassine which has been treated on one side with a release compound (such as silicone, chromium complexes, and the like) is employed as a release sheet. After curing in the press, this sheet separates from the assembly adjacent to its treated surface and remains adhered to the other assembly. However, major problems exist with the utilization of such treated glassine papers as release sheets, in that the release compound interferes with glue adhesion—thereby requiring that the laminate be deep sanded to completely remove the glassine paper from the surface of the laminate. Moreover, the required sanding often causes the release of chromium and other complexes, thereby raising environmental concerns.

Several attempts have been made to produce commercially effective high pressure laminate release sheets. In U.S. Pat. No. 3,050,434, Emily Jr. et al. discloses a kraft paper core sheet impregnated with phenolic resin and coated with an alginic acid salt (such as sodium alginate) for use as a release sheet. However, such alginates are relatively expensive. Furthermore, it was found the alginate salt was mostly absorbed by the paper, thereby creating release problems. In U.S. Pat. No. 3,215,579, Hagen teaches release sheets which are first sized with an aqueous solution of water soluble alkaline earth or alkaline earth metal salts and then coated with sodium alginate. However, this process was costly and seemed to present release and salt absorption problems. Ward, in U.S. Pat. No. 3,898,114, teaches release coatings comprising poly(vinyl alcohol) and methyl cellulose. In U.S. Pat. No. 4,243,461, Jaisle et al. teaches release sheets comprising grades of resin-free paper having a water absorption of at least about 200 seconds sized with a water soluble salt of an earth metal or alkaline earth metal. Jaisle et al. further teaches, in U.S. Pat. No. 4,263,073, the coating of these release sheets with a mixture of triglyceride, lecithin, or hydrolyzed lecithin and a salt of alginic acid. However, the use of these type papers are relatively expensive. Gray, in U.S. Pat. No. 4,327,121, teaches the use of electron beam radiation to polymerize certain acrylic functional materials as coatings for release sheets. In U.S. Pat. No. 4,510,199, Brooker teaches release sheets comprising a thermosetting resin impregnated fibrous core sheet coated with a mixture of wax and alginate salt. The use of release sheets coated with a mixture of a silicone-acrylate release component, an acrylate-containing cross-linking agent, and an acrylic ester monomer or oligomer are taught by Lu in U.S. Pat. No. 5,425,991.

Despite these, and other, efforts there still exists a need in the art for an economical coated release sheet which can be employed to produce high pressure laminates.

Therefore, an object of this invention is to disclose an improved method of producing high pressure laminated materials.

Another object of the present invention is to disclose coated paper for use as release sheets in the production of heat and pressure consolidated laminates.

Other objects, features, and advantages of the invention will be apparent from the details of the invention as more fully described and claimed.

SUMMARY OF THE INVENTION

These and other objects of the invention, as embodied and broadly described herein, are met by an improved method of laminating sheets of acrylic or polyester resins which employs as a release sheet cellulosic-based paper substrates which have been coated on at least one side with an aqueous polymer coating composition. These release coating compositions are produced by reacting a mixture containing water-dispersible stabilizing polymer, vinylic monomer, and, optionally, fatty acid, in an emulsion polymerization reaction. Additional components may be added to give the coating compositions desired characteristics. Paper coated with these compositions produce release sheets exhibiting excellent separation properties for use in the production of high pressure laminates. Moreover, the polymeric nature of the release coating composition should permit employment of these release sheets without the need for extensive sanding to remove the coating in order to make the laminate surface susceptible to adhesive bonding.

DESCRIPTION OF THE DRAWING

For a better understanding of the invention, reference may be made to the preferred embodiment exemplary of the invention, shown in the accompanying drawing.

DESCRIPTION OF THE PREFERRED EMBODIMENT

Figure 1:
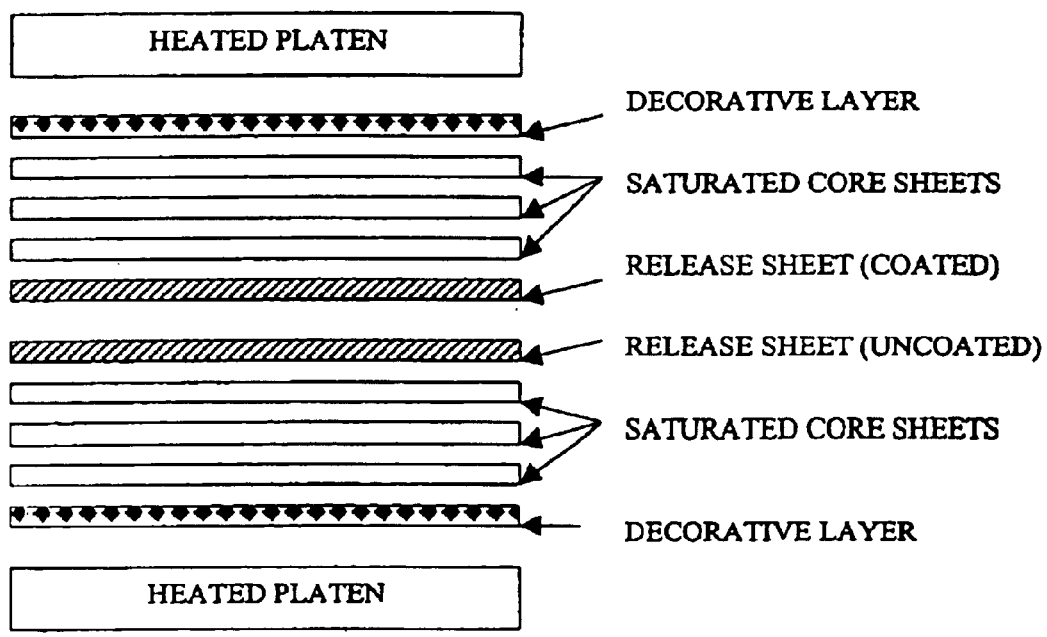
FIG. 1 illustrates a laminate stack-up set wherein only one release sheet is coated with the aqueous polymeric release coating composition. Resin from the treated core stock penetrates the dry paper of the release sheet. After pressing, the release sheet facilitates separation of the laminates (and the release sheets will be part of the decorative laminate).

The invention is an improved method of laminating sheets of acrylic and/or polyester resins which includes the step of pressing a resinated sheet against a sheet of paper having an easy-release surface, wherein the improvement comprising pressing the resinated sheet against a sheet of paper having at least one outer surface coated with an aqueous polymeric release coating composition produced by reacting in an emulsion polymerization reaction a mixture comprising:
  a) from about 10.0% to about 60.0% by total weight of the mixture of a member selected from the group consisting of water-dispersible stabilizing polymers having an average molecular weight in the range of about 2,000 to about 12,000 and combinations thereof;
  b) from about 40.0% to about 90.0% by total weight of the mixture of a member selected from the group consisting of vinylic monomers and combinations thereof;
  c) up to about 20.0% by total weight of the mixture of a member selected from the group consisting of fatty acids having an acid number of at least 100 and combinations thereof;
  d) up to about 3.0% by total weight of the mixture of a chain transfer agent;
  e) up to about 20.0% by total weight of the mixture of a member selected from the group consisting of non-ionic surfactants, ionic surfactants, and combinations thereof;
  f) a catalytic amount of at least one polymerization initiator, and
  g) the balance of the mixture being water.

A preferred embodiment of the invention is an improved method of laminating sheets of acrylic and/or polyester resins which includes the step of pressing a resinated sheet against a sheet of paper having an easy-release surface, wherein the improvement comprising pressing the resinated sheet against a sheet of paper having at least one outer surface coated with an aqueous polymeric release coating composition produced by reacting in an emulsion polymerization reaction a mixture comprising:
  a) from about 15.0% to about 25.0% by total weight of the mixture of a member selected from the group consisting of water-dispersible stabilizing polymers having an average molecular weight in the range of about 5,000 to about 1,000 and combinations thereof;
  b) from about 75.0% to about 85.0% by total weight of the mixture of a member selected from the group consisting of vinylic monomers and combinations thereof;
  c) up to about 10.0% by total weight of the mixture of a member selected from the group consisting of fatty acids having an acid number of at least 100 and combinations thereof;
  d) up to about 2.0% by total weight of the mixture of a chain transfer agent;
  e) up to about 5.0% by total weight of the mixture of a member selected from the group consisting of non-ionic surfactants, ionic surfactants, and combinations thereof;
  f) a catalytic amount of at least one polymerization initiator; and
  g) the balance of the mixture being water.

If desired, the present method may employ aqueous polymeric release coating compositions containing one or more adjuvants for improving the physical and/or mechanical properties of the release sheets on which the compositions are applied. Suitable adjuvants include, for example, thickening agents, coalescent solvents such as polyols, defoaming or dispersing agents, and agents for improving other properties of the coated kraft release sheets. Other additives (such as aqueous ammonia) can be added to adjust the pH of the release coating compositions.

The vinylic monomers are copolymerized in an aqueous polymerization medium by reacting a mixture of vinylic monomers, water-dispersible polymers, and a catalytic amount of at least one polymerization initiator. Where desired, fatty acids, surfactant and/or chain transfer agents may be employed to tailor the molecular weight, particle size, and stability of the emulsion. The emulsion polymerization reaction is typically conducted at a temperature within the range of about 30° C. to about 100° C. It is, however, preferred that the polymerization reaction be conducted at a temperature in the range of about 50° C. to about 80° C.

Polymers which are suitable for use in the present method must be water-dispersible and have a average molecular weight is in the range of about 2,000 to about 12,000; with the preferred molecular weights being in the range of about 5,000 to about 1 1,000. Water-dispersible polymers having an acid number of 100 or less can be utilized in the present method without neutralization. However, polymers having an acid number of greater than 100 must be neutralized prior to dispersion in an aqueous medium. Aqueous bases suitable for use in neutralizing these polymers to produce water-dispersible polymers include organic and inorganic compounds (such as sodium hydroxide, potassium hydroxide, ammonium hydroxide, amines, sulfates, and the like). The term "water-dispersible polymers" as used herein includes polymers having an acid number of greater than 100 which have been neutralized for dispersion in an aqueous medium. Preferred water-dispersible stabilizing polymers include members selected from the group consisting of the non-emulsion polymerization reaction product of:
  a) a member selected from the group consisting of acrylic acid, methacrylic acid, fumaric acid, maleic anhydride, and combinations thereof, and
  b) a member selected from the group consisting of vinylic monomer and combinations thereof.

Preferred non-emulsion polymerization reactions include bulk polymerization reactions and solution polymerization reactions.

Vinylic monomers which are suitable for use in the present method in both the emulsion polymerization reaction and the non-emulsion polymerization reaction include styrenic monomers, acrylic monomers, methacrylic monomers, ethylenic monomers, and the like. The term "acrylic monomer" as employed herein includes members of the group consisting of acrylic acid, methacrylic acid, acrylic acid esters, methacrylic acid esters, derivatives of acrylic acid, derivatives of methacrylic acid, and mixtures thereof. Examples of suitable acrylic and methacrylic ester monomers include the $C_1$–$C_{30}$ alkyl ester derivatives.

Methacrylic esters suitable for use in the present method in both the emulsion polymerization reaction and the non-emulsion polymerization reaction include, but not limit to, the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Acrylate esters suitable for use in the present method in both the emulsion polymerization reaction and the non-emulsion polymerization reaction include methyl acrylate, ethyl acrylate, n-propyl acrylate, isopropyl acrylate, n-butyl acrylate, n-decyl acrylate, 2-ethylhexal acrylate, and the like.

Methacrylic acid derivative acrylic monomers suitable for use in the present method in both the emulsion polymerization reaction and the non-emulsion polymerization reaction include methacrylic acid derivatives such as methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylic acid derivatives suitable for use in the present method in both the emulsion polymerization reaction and the non-emulsion polymerization reaction include acrylic acid and its salts, acrylonitrile, acrylamide, methyl alpha-chloroacrylate, methyl 2-cyanoacrylate, N-ethylacrylamide, N,N-diethylacrylamide acrolein, and the like.

Ethylenic monomers suitable for use in the present method in both the emulsion polymerization reaction and the non-emulsion polymerization reaction include vinyl pyridine, vinyl pyrollidone, sodium crotonate, methyl crotonate, crotonic acid, maleic anhydride, and the like.

Fatty acids which are suitable for use in the present method include those fatty acids having an acid number of at least 100 which contain a range of carbon atoms from about $C_2$ to about $C_{24}$, with the preferred range being from about $C_{16}$ to $C_{20}$. It is further preferred that the fatty acid be vegetable or tall oil based. It is most preferred that the fatty acid be tall oil based and contain from about 15.0% to about 18.0% conjugated double bonds. While up to about 20.0% by total weight of the mixture may be fatty acid, a preferred range of fatty acid is up to about 10.0% by total weight of the mixture. As used herein the term "fatty acid" includes difunctional fatty acids.

Where desired, up to about 3.0% (preferably up to about 2.0%) by total weight of the mixture of a chain transfer agent may be employed in the polymerization reaction in order to lower the molecular weight of the emulsion polymer. Preferred chain transfer agents include, but are not limited to, the following: dodecyl mercaptan, mercaptoacetic acid, mercaptopropionic acid, octyl mercaptan, 2-mercaptoethanol, alkyl mercaptopropionates, and combinations thereof.

Where desired, a surfactant may be employed in the emulsion polymerization reaction in an amount up to about 20.0% (preferably up to about 5.0%) by weight of the monomer mixtures. Surfactants suitable for use in the emulsion polymerization reaction include members selected from the group consisting of nonionic surfactants, anionic surfactants, and combinations thereof. Preferred anionic surfactants include alkyl sulfates, ether sulfates, phosphate esters, sulfonates, and the like. Preferred nonionic surfactants include alcohol ethoxylates, alkylphenol ethoxylate, phenol ethoxylate, block copolymers, and the like. Anionic and non-ionic surfactants containing polymerizable groups (known in the art as "polymerizable surfactants") are also suitable for use in the present method.

A catalytic amount of at least one polymerization initiator is used in the emulsion polymerization reaction. The amount of initiator employed commonly comprises from about 0.5% to about 5.0% (preferably from about 0.5% to about 1.5%) by weight of the total mixture used to produce the emulsion polymer. Traditional emulsion polymerization initiators (such as thermal initiators, redox initiators, and combinations thereof) are suitable for use in the emulsion polymerization reaction. The type of polymerization initiator actually employed is known in the art to depend upon the desired temperature for the reaction. Thermal initiators which are suitable for use include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, and combinations thereof. Suitable redox initiators include, but are not limited to, the following: sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

The pH at which the release coating compositions are prepared may affect their stability. It is preferred that the pH range be from about 7.0 to about 11.0; with the most preferred pH range being about 8.0 to about 9.5.

Where desired, salts of alginic acid (such as sodium alginate, zinc alginate, and the like) may be added to the polymeric release coating composition prior to coating the release sheet in order to adjust the composition's rheology and to increase the hold-out of the coating on the surface of the paper. Sterates (such as calcium stearate, zinc stearate, and the like) may be added to the polymeric release coating composition prior to coating the release sheet to decrease the tackiness of the coating composition. Fillers (such as clay, talc, and the like) and commonly employed waxes may also be added to the polymeric release coating composition prior to coating the release sheet in order to adjust the coating composition's properties. Where employed, it is preferred to add to the polymeric release coating composition from about 0.1% to about 30.0% (more preferably from about 0.5% to about 15.0%) by total weight of the polymeric release coating composition a member selected from the group consisting of salts of alginic acid, talc, clay, wax, calcium stearate, zinc stearate, and combinations thereof.

It is preferred that the coat-weight of the release coating be applied to the cellulosic-based paper release sheet in a range of about 0.7 to about 3.0 dry pounds of release coating composition per 1,000 square feet of paper. It is further preferred that the coat-weight be in the range of about 1.0 to about 2.0 dry pounds of release coating composition per 1,000 square feet of paper.

The release coating compositions may be applied to the paper release sheet in any manner known in the art which results in a uniform covering of the paper by the coating composition. Suitable application methods include the use of blades, air knifes, rod coaters, and the like. While the release coating compositions may be applied to either or both sides of release sheet, it is preferred that the coatings be applied to the felt side. It is also preferred that the release coating compositions be applied to paper sheets which are resin-free. It is further preferred that the release sheet be internally sized.

The following examples are provided to further illustrate the present method and are not to be construed as limiting the invention in any manner.

EXAMPLE 1

A release sheet coating was produced by charging a 1000 ml resin kettle with 72.0 g of MOREZ 101 (a styrene acrylic hard resin from Morton International), 18.0 g of EMERY 531 (a tallow fatty acid from Henkel Corporation), 22.5 g of ammonium hydroxide, and 468.0 g of deionized water. The mixture was heated to 82° C. and maintained at that temperature until the resin and fatty acid were completely dissolved (approximately 3 hours). The pH of the initial charge was adjusted to 9.0, and 4.5 g of TERGITOL NP-10 (a non-ionic surfactant from Union Carbide) was added to the mixture. A solution of 2.43 g of ammonium persulfate in 10.0 g of water was also added. Thereafter, a monomer mixture of 28.8 g of methyl methacrylate, 129.6 g of 2-ethylhexacrylate, and 129.6 g of butyl acrylate was added continuously over a 2 hour period After the monomer mixture feed was completed, the reaction was held for 30 minutes, whereupon an additional charge of 0.45 g of ammonium persulfate in 10.0 g of water and 0.189 g of t-butyl hydroxylpersulfate was added to convert any residual monomers. The product was allowed to cool and was filtered through a 325-mesh screen. The resulting release sheet coating composition (hereinafter referred to as Composition No. 1) had a non-volatile content of 42.19% and a pH of 8.43.

EXAMPLE 2

A release sheet coating composition was produced by charging a 1000 ml resin kettle with 36.0 g of MOREZ 101 (a styrene acrylic hard resin from Morton International), 18.0 g of EMERY 531 (a tallow fatty acid from Henkel Corporation), 13.5 g of ammonium hydroxide, and 468.0 g of deionized water. The mixture was heated to 82.2° C. and maintained at that temperature until the resin and fatty acid were completely dissolved (approximately 3 hours). The pH of the initial charge was adjusted to 9.2, and 18.0 g of IGEPAL CA-897 (an emulsion polymerization surfactant stabilizer from Rhone-Poulenc) was added to the mixture. A solution of 2.4 g of ammonium persulfate in 10.0 g of water was also added. Thereafter, a monomer mixture of 115.2 g of methyl methacrylate, 115.2 g of 2-ethylhexacrylate, and 57.6 g of butyl acrylate was added continuously over a 2 hour period. After the monomer mixture feed was completed, the reaction was held for 30 minutes, whereupon an additional charge of 0.45 g of ammonium persulfate in 10.0 g of water was added to convert any residual monomers. The product was allowed to cool and was filtered through a 325-mesh screen. The resulting release sheet coating composition (hereinafter referred to as Composition No. 2) had a non-volatile content of 40.7% and a pH of 8.79.

EXAMPLE 3

A release sheet coating composition was produced by charging a 1000 ml resin kettle with 72.0 g of SMA 1000 (a 1:1 styrene:maleic anhydride copolymer from Elf-Atochem), 18.0 g of EMERY 531 (a tallow fatty acid from Henkel Corporation), 40.5 g of ammonium hydroxide, and 468.0 g of deionized water. The mixture was heated to 82° C. and maintained at that temperature until the resin and fatty acid were completely dissolved (approximately 3 hours). The pH of the initial charge was adjusted to 9.0, and 4.5 g of TERGITOL NP-10 (a non-ionic surfactant from Union Carbide) was added to the mixture. A solution of 2.43 g of ammonium persulfate in 10.0 g of water was also added. Thereafter, a monomer mixture of 57.6 g of methyl methacrylate, 115.2 g of 2-ethylhexacrylate, and 115.2 g of butyl acrylate was added continuously over a 2 hour period. After the monomer mixture feed was completed, the reaction was held for 30 minutes, whereupon an additional charge of 2.43 g of ammonium persulfate in 10.0 g of water and 0.189 g of t-butyl hydroxylpersulfate was added to convert any residual monomers. The product was allowed to cool and was filtered through a 325-mesh screen. The resulting release sheet coating composition (hereinafter referred to as Composition No. 3) had a non-volatile content of 42.3% and a pH of 8.75.

EXAMPLE 4

A release sheet coating composition was produced by charging a 1000 ml resin kettle with 72.0 g of SMA 1000 (a 1:1 styrene:maleic anhydride copolymer from Elf-Atochem), 18.0 g of EMERY 531 (a tallow fatty acid from Henkel Corporation), 40.5 g of ammonium hydroxide, and 468.0 g of deionized water. The mixture was heated to 82° C. and maintained at that temperature until the resin and fatty acid were completely dissolved (approximately 3 hours). The pH of the initial charge was adjusted to 9.0, and 4.5 g of TERGITOL NP-10 (a non-ionic surfactant from Union Carbide) was added to the mixture. A solution of 2.43 g of ammonium persulfate in 10.0 g of water and a solution of 0.405 g of cumene hydroperoxide in 7.2 g of water was also added. Thereafter, a monomer mixture of 43.2 g of alpha-methylstyrene, 115.2 g of 2-ethylhexacrylate, and 129.6 g of butyl acrylate was added continuously over a 2 hour period. After the monomer mixture feed was completed, the reaction was held for 30 minutes, whereupon an additional charge of 2.43 g of ammonium persulfate in 10.0 g of water and 0.189 g of t-butyl hydroxylpersulfate was added to convert any residual monomers. The product was allowed to cool and was filtered through a 325-mesh screen. The resulting release sheet coating composition (hereinafter referred to as Composition No. 4) had a non-volatile content of 39.5% and a pH of 7.61.

EXAMPLE 5

A release sheet coating composition was produced by charging a 1000 ml resin kettle with 72.0 g of SMA 1000 (a 1:1 styrene:maleic anhydride copolymer from Elf-Atochem), 14.4 g of SMA 2000 (a 2:1 styrene:maleic anhydride copolymer from Elf-Atochem), 42.5 g of ammonium hydroxide, and 468.0 g of deionized water. The mixture was heated to 82° C. and maintained at that temperature until the resin and fatty acid were completely dissolved (approximately 3 hours). The pH of the initial charge was adjusted to 9.0, and 7.2 g of TERGITOL NP-10 (a non-ionic surfactant from Union Carbide) was added to the mixture. A solution of 2.43 g of ammonium persulfate in 10.0 g of water and a solution of 0.405 g of cumene hydroperoxide in 7.2 g of water was also added. Thereafter, a monomer mixture of 36.0 g of methyl methacrylate, 115.2 g of 2-ethylhexacrylate, and 129.6 g of butyl acrylate was added continuously over a 2 hour period. After the monomer mixture feed was completed, the reaction was held for 30 minutes, whereupon an additional charge of 2.43 g of ammonium persulfate in 10.0 g of water and 0.189 g of t-butyl hydroxylpersulfate was added to convert any residual monomers. The product was allowed to cool and was filtered through a 325-mesh screen. The resulting release sheet coating composition (hereinafter referred to as Composition No. 5) had a non-volatile content of 41.5% and a pH of 8.64.

EXAMPLE 6

A release sheet coating composition was produced by charging a 1000 ml resin kettle with 32.0 g of MOREZ 101 (a styrene acrylic hard resin from Morton International), 16.0 g of Emery 531 (a tallow fatty acid from Henkel Corporation), 12.0 g of ammonium hydroxide, and 416.0 g of deionized water. The mixture was heated to 82° C. and maintained at that temperature until the resin and fatty acid were completely dissolved (approximately 3 hours). The pH of the initial charge was adjusted to 8.6, and 5.52 g of SURFYNOL CO-436 (an ionic surfactant from Air Products) was added to the mixture. A solution of 2.4 g of ammonium persulfate in 8.0 g of water and a solution of 0.36 g of cumene hydroperoxide in 6.4 g of water were also added. Thereafter a monomer mixture of 85.1 g of styrene, 109.4 g of 2-ethylhexacrylate, and 48.6 g of butyl acrylate was prepared, and 24.32 g of the mixture was added to the reactor. After 15 minutes, a solution of 12.8 g of TERGITOL NP-10 (a non-ionic surfactant from Union Carbide) and 12.8 g of PLURONIC L-61 (a non-ionic surfactant from BASF) in 80 g of water was added, then the remaining amount of monomer mixture was added continuously over a 2 hour period. After the monomer mixture feed was completed, the reaction was held for 30 minutes, whereupon an additional charge of 0.4 g of ammonium persulfate in 10.0 g of water and 0.17 g of t-butyl hydroxylpersulfate was added to convert any residual monomers. The product was allowed to cool and was filtered through a 325-mesh screen. The resulting release sheet coating composition (hereinafter referred to as Composition No. 6) had a non-volatile content of 37.27% and a pH of 8.32.

EXAMPLE 7

A release sheet coating composition was produced by charging a 1000 ml resin kettle with 72.0g of SMA 1000 (a 1:1 styrene:maleic anhydride copolymer from Elf-Atochem), 18.0 g of EMERY 531 (a tallow fatty acid from Henkel Corporation), 22.5 g of ammonium hydroxide, and 468.0 g of deionized water. The mixture was heated to 82° C. and maintained at that temperature until the resin and fatty acid were completely dissolved (approximately 4 hours). The pH of the initial charge was adjusted to 9.0, and 4.5 g of TERGITOL NP-10 (a non-ionic surfactant from Union Carbide) was added to the mixture. A solution of 2.43 g of ammonium persulfate in 9.0 g of water was also added. Thereafter, a monomer mixture of 28.8 g of methyl methacrylate, 129.6 g of 2-ethylhexacrylate, and 129.6 g of butyl acrylate was added continuously over a 2 hour period. After the monomer mixture feed was completed, the reaction was held for 30 minutes, whereupon an additional charge of 2.43 g of ammonium persulfate in 10.0 g of water and 0.189 g of t-butyl hydroxylpersulfate was added to convert any residual monomers. The product was allowed to cool and was filtered through a 325-mesh screen. The resulting release sheet coating composition (hereinafter referred to as Composition No. 7) had a non-volatile content of 41.9% and a pH of 8.37.

EXAMPLE 8

A series of high pressure laminate release sheets were produced using the above-noted release sheet coating compositions. The compositions were individually applied to the felt side of sheets of 115 lb/3000 ft$^2$ HD 03 (an unsized saturating kraft paper from Westvaco Corporation) using either a number 0 or a number 8 Mayer rod. The compositions were also individually applied to the felt side of sheets of 115 lb/3000 ft$^2$ HD CO1 (a sized saturating kraft paper from Westvaco Corporation) using either a number 0 or a number 8 Mayer rod. The coated release sheets were subsequently dried in a convection oven at 105° C. for 30 seconds, then allowed to cool.

A series of high pressure laminates were produced using these release sheets. A number of laminate assemblies were made as shown in FIG. 1 using 12" by 12" paper sheets. A top laminate assembly consisting of one decorative sheet, three phenolic resin saturated core sheets, and a coated release sheet was paired with a bottom laminate assembly consisting of one decorative sheet, three phenolic resin saturated core sheets, and a uncoated release sheet of the same type of saturating kraft paper (i.e., either HD 03 or HD CO1) as the corresponding coated release sheet. The coated side of the coated release sheet was placed facing the felt side of the uncoated release sheet. The resulting stack-up set of sheets was placed between two polished press plates. A total of six such laminate stack-up sets were placed one on top of the other, and the resulting pile of sets was placed in a laminating press.

The pile of sets was subjected to a pressure of 1,200 lb/in$^2$ for about an hour. During this time, the temperature of the pile was raised from 100° F. to 260° F. over a period of about 23 minutes, then further increased to 285° F. over an additional period of about 17 minutes. The temperature of the pile was then allowed to cool to 100° F. over a period of about 20 minutes prior to removal from the press. The resulting laminate sets were evaluated for ease of separation, and the results are shown in Table 1 below.

TABLE 1

| | Evaluation of High Pressure Laminate Release Sheet Properties | | | |
|---|---|---|---|---|
| Compo- | Coat Weight[1] | | Release[2] | |
| sition | Unsized Paper[3] | Sized Paper[4] | Unsized Paper[3] | Sized Paper[4] |
| 1 | 1.49 | 1.26 | 6 | 8 |
| 2 | 1.57 | 1.26 | 8 | 9 |
| 3 | 2.12 | 1.41 | 9 | 9 |

TABLE 1-continued

Evaluation of High Pressure Laminate Release Sheet Properties

| Compo-sition | Coat Weight[1] | | Release[2] | |
| --- | --- | --- | --- | --- |
| | Unsized Paper[3] | Sized Paper[4] | Unsized Paper[3] | Sized Paper[4] |
| 4 | 1.30 | 1.19 | 10 | 10 |
| 5 | 1.73 | 1.38 | 6 | 9 |
| 6 | 1.68 | 1.20 | 7 | 9.5 |
| 7 | 1.70 | 1.30 | 10 | 10 |

[1]Dry pounds of release coating composition applied per 1000 square feet of saturating kraft paper.
[2]The ease of release was rated on a scale of from 1 to 10, where 9–10 is considered excellent, 7–8 good, 6–7 average, and 5 or less is poor. A value of 10 represented laminates that fell apart right after pressing without applying any force. A value of 9 represented laminates that separated at the edges right after pressing, but there was a little tackiness present. A value of 8 represented laminates that fell apart during trimming. A value of 7 represented laminates that required some pulling to separate. Any evidence of fiber tear received a rating of 5 or lower.
[3]HD 03 (an unsized saturating kraft paper from Westvaco Corporation)
[4]HD CO1 (a sized saturating kraft paper from Westvaco Corporation)

As shown above, the coated release sheets exhibited superior release properties when employed in the production of high pressure laminates.

EXAMPLE 9

A release sheet coating composition was produced using the following procedure. A sodium alginate solution was produced by charging a 500 ml beaker with 135.0 g of deionized water, and 15.0 g of SCOGIN XXL (a low molecular weight sodium alginate from Pronova Scogin). The solution was stirred for 30 minutes. A 200 ml beaker was charged with 60.0 g of Composition No. 7, then 12.9 g of the alginate solution was added with stirring. The resulting mixture was stirred for an additional fifteen minutes, allowed to settle, then filtered through a 325-mesh screen. The resulting release sheet coating composition (hereinafter referred to as Composition A) had a solids level of about 35.5% and a Brookfield viscosity of about 300 cps (#4 at 100 rpm, 22° C.).

EXAMPLE 10

A release sheet coating composition was produced using the following procedure. A sodium alginate solution was produced by charging a 500 ml beaker with 135.0 g of deionized water, and 15.0 g of SCOGIN XXL (a low molecular weight sodium alginate from Pronova Scogin). The solution was stirred for 30 minutes. A 200 ml beaker was charged with 51.09 g of Composition No. 7, then 25.02 g of the alginate solution was added with stirring. An additional 10.9 g of deionized water was added to the mixture. The resulting mixture was stirred for an additional fifteen minutes, allowed to settle, then filtered through a 325-mesh screen. The resulting release sheet coating composition (hereinafter referred to as Composition B) had a solids level of about 27% and a Brookfield viscosity of about 300 cps (#4 at 100 rpm, 22° C.).

EXAMPLE 11

A release sheet coating composition was produced using the following procedure. A sodium alginate solution was produced by charging a 500 ml beaker with 135.0 g of deionized water, and 15.0 g of SCOGIN XXL (a low molecular weight sodium alginate from Pronova Scogin). The solution was stirred for 30 minutes. A 200 ml beaker was charged with 31.2 g of Composition No. 7, then 30.7 g of the alginate solution was added with stirring. The resulting mixture was stirred for an additional fifteen minutes, allowed to settle, then filtered through a 325-mesh screen. The resulting release sheet coating composition (hereinafter referred to as Composition C) had a solids level of about 26% and a Brookfield viscosity of about 300 cps (#4 at 100 rpm, 22° C.).

EXAMPLE 12

A release sheet coating composition was produced using the following procedure. A sodium alginate solution was produced by charging a 500 ml beaker with 100 parts by weight of deionized water, and 1 part by weight of SCOGIN MV (a medium molecular weight sodium alginate from Pronova Scogin). The solution was stirred for 30 minutes. A 200 ml beaker was charged with 60.0 g of Composition No. 7, then 36.0 g of the alginate solution was added with stirring. The resulting mixture was stirred for an additional fifteen minutes, allowed to settle, then filtered through a 325-mesh screen. The resulting release sheet coating composition (hereinafter referred to as Composition D) had a solids level of about 26% and a Brookfield viscosity of about 600 cps (#4 at 100 rpm, 22° C.).

EXAMPLE 13

A series of high pressure laminate release sheets were produced using the above-noted release sheet coating compositions. The compositions were individually applied to the felt side of sheets of 115 lb/3000 ft$^2$ HD CO1 (a sized saturating kraft paper from Westvaco Corporation) using a number 0 Mayer rod. The coated release sheets were subsequently dried in a convection oven at 105° C. for 30 seconds, then allowed to cool.

A series of high pressure laminates were produced using these release sheets via the procedure noted in Example 8 above. The resulting laminate sets were evaluated for ease of separation, and the results are shown in Table 2 below.

TABLE 2

Evaluation of Laminate Release Sheet Properties

| Composition | Coat Weight[1] | Release[2] |
| --- | --- | --- |
| A | 1.00 | 10 |
| B | 0.80 | 10 |
| C | 0.96 | 8 |
| D | 0.78 | 10 |

[1]Dry pounds of release coating composition applied per 1000 square feet of saturating kraft paper.
[2]The ease of release was rated on a scale of from 1 to 10, where 9–10 is considered excellent, 7–8 good, 6–7 average, and 5 or less is poor. A value of 10 represented laminates that fell apart right after pressing without applying any force. A value of 9 represented laminates that separated at the edges right after pressing, but there was a little tackiness present. A value of 8 represented laminates that fell apart during trimming. A value of 7 represented laminates that required some pulling to separate. Any evidence of fiber tear received a rating of 5 or lower.

As shown above, the coated release sheets exhibited superior properties when employed in the production of high pressure laminates.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved method of laminating sheets of acrylic and/or polyester resins which includes the step of pressing a resinated sheet against a sheet of paper having an easy-release surface, wherein the improvement comprising pressing the resinated sheet against a sheet of paper having at least one outer surface coated with an aqueous polymeric release coating composition produced by reacting in an emulsion polymerization reaction a mixture comprising:
   a) from about 10.0% to about 60.0% by total weight of the mixture of a member selected from the group consisting of water-dispersible stabilizing polymers and combinations thereof;
   b) from about 40.0% to about 90.0% by total weight of the mixture of a member selected from the group consisting of vinylic monomers and combinations thereof;
   c) up to about 20.0% by total weight of the mixture of a member selected from the group consisting of fatty acids having an acid number of at least 100 and combinations thereof;
   d) up to about 3.0% by total weight of the mixture of a chain transfer agent;
   e) up to about 20.0% by total weight of the mixture of a member selected from the group consisting of non-ionic surfactants, ionic surfactants, and combinations thereof;
   f) a catalytic amount of at least one polymerization initiator; and
   g) the balance of the mixture being water.

2. The method of claim 1 which further comprises pressing the resinated sheet against a sheet of paper having at least one outer surface coated with an aqueous polymeric release coating composition produced by reacting in an emulsion polymerization reaction a mixture comprising:
   a) from about 15.0% to about 25.0% by total weight of the mixture of a member selected from the group consisting of water-dispersible stabilizing polymers and combinations thereof;
   b) from about 75.0% to about 85.0% by total weight of the mixture of a member selected from the group consisting of vinylic monomers and combinations thereof;
   c) up to about 10.0% by total weight of the mixture of a member selected from the group consisting of fatty acids having an acid number of at least 100 and combinations thereof;
   d) up to about 2.0% by total weight of the mixture of a chain transfer agent;
   e) up to about 5.0% by total weight of the mixture of a member selected from the group consisting of non-ionic surfactants, ionic surfactants, and combinations thereof;
   f) a catalytic amount of at least one polymerization initiator; and
   g) the balance of the mixture being water.

3. The method of claim 1 wherein the water-dispersible stabilizing polymer is a member selected from the group consisting of the non-emulsion polymerization reaction product of:
   a) a member selected from the group consisting of acrylic acid, methacrylic acid, fumaric acid, maleic anhydride, and combinations thereof; and
   b) a member selected from the group consisting of vinylic monomer and combinations thereof.

4. The method of claim 3 wherein the vinylic monomer employed in the non-emulsion polymerization reaction is a member selected from the group consisting of styrenic monomers, acrylic monomers, methacrylic monomers, ethylenic monomers, and combinations thereof.

5. The method of claim 4 wherein the vinylic monomer employed in the non-emulsion polymerization reaction is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexal acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, salts of acrylic acid, acrylonitrile, acrylamide, methyl alpha-chloroacrylate, methyl 2-cyanoacrylate, N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

6. The method of claim 1 wherein the vinylic monomer employed in the emulsion polymerization reaction is a member selected from the group consisting of styrenic monomers, acrylic monomers, methacrylic monomers, ethylenic monomers, and combinations thereof.

7. The method of claim 6 wherein the vinylic monomer employed in the emulsion polymerization reaction is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexal acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, salts of acrylic acid, acrylonitrile, acrylamide, methyl alpha-chloroacrylate, methyl 2-cyanoacrylate, N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

8. The method of claim 1 wherein the fatty acid is a member selected from the group consisting of fatty acids containing from 12 to 24 carbon atoms and combinations thereof.

9. The method of claim 1 wherein the chain transfer agent is a member selected from the group consisting of dodecyl mercaptan, mercaptoacetic acid, mercaptopropionic acid, octyl mercaptan, 2-mercaptoethanol, alkyl mercaptopropionates, and combinations thereof.

10. The method of claim 1 wherein the nonionic surfactant is a member selected from the group consisting of ethoxylated alkylphenols, ethoxylated fatty alcohols, ethylene oxide/propylene oxide block copolymers, and combinations thereof.

11. The method of claim 1 wherein the anionic surfactant is a member selected from the group consisting of alkyl sulfates, ether sulfates, phosphate esters, sulfonates, and combinations thereof.

12. The method of claim 1 wherein the polymerization initiator comprises from about 0.5% to about 5.0% by total weight of the mixture and is a member selected from the group consisting of thermal initiators, redox initiators, and combinations thereof.

13. The method of claim 12 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof.

14. The method of claim 12 wherein the redox initiator is a member selected from the group consisting of cumene hydroperoxide-sodium metabisulfite, cumene hydroperoxide-iron (II) sulfate, and combinations thereof.

15. The method of claim 1 which further comprises the addition to the release coating composition of from about 0.1% to about 30.0% by total weight of the release coating composition of a member selected from the group consisting of salts of alginic acid, talc, clay, wax, calcium stearate, zinc stearate, and combinations thereof.

16. The method of claim 15 which further comprises the addition to the release coating composition of from about 0.5% to about 15.0% by total weight of the release coating composition of a member selected from the group consisting of salts of alginic acid, talc, clay, wax, calcium stearate, zinc stearate, and combinations thereof.

17. The method of claim 1 wherein the release coating composition is applied to the paper sheet at a coat-weight in the range of about 0.7 to about 3.0 dry pounds of coating composition per 1,000 square feet of paper.

18. The method of claim 17 wherein the release coating composition is applied to the paper sheet at a coat-weight in the range of about 1.0 to 2.0 dry pounds of coating composition per 1,000 square feet of paper.

19. The method of claim 1 wherein the pH of the release coating composition is in the range of about 7.0 to about 11.

20. The method of claim 19 wherein the pH of the release coating composition is in the range of about 8.0 to about 9.5.

* * * * *

UNITED STATES PATENT AND TRADEMARK OFFICE
CERTIFICATE OF CORRECTION

PATENT NO. : 6,723,200 B1
DATED : April 20, 2004
INVENTOR(S) : Sukun Zhang

It is certified that error appears in the above-identified patent and that said Letters Patent is hereby corrected as shown below:

Column 1,
Line 16, delete "arc coated" and substitute therefor -- are coated --.

Column 3,
Line 67, delete "1,000" and substitute therefor -- 11,000 --.

Column 4,
Line 43, delete "1 1,000." and substitute therefor -- 11,000. --.

Column 5,
Line 63, delete "$C_2$" and substitute therefor -- $C_{12}$ --.

Column 11,
Table 1 continued, line 19, delete "duringtrimming." and substitute therefor
-- during trimming. --.

Signed and Sealed this

Eleventh Day of October , 2005

JON W. DUDAS
*Director of the United States Patent and Trademark Office*